Sept. 15, 1931.  L. A. McDOWELL ET AL  1,823,156
VEHICLE BODY CONSTRUCTION
Filed March 29, 1928   2 Sheets-Sheet 1

*Fig.1.*

INVENTOR.
LAMONT A. McDOWELL AND
OTTO F. GRAEBNER.
BY
*J King Harness*
ATTORNEY.

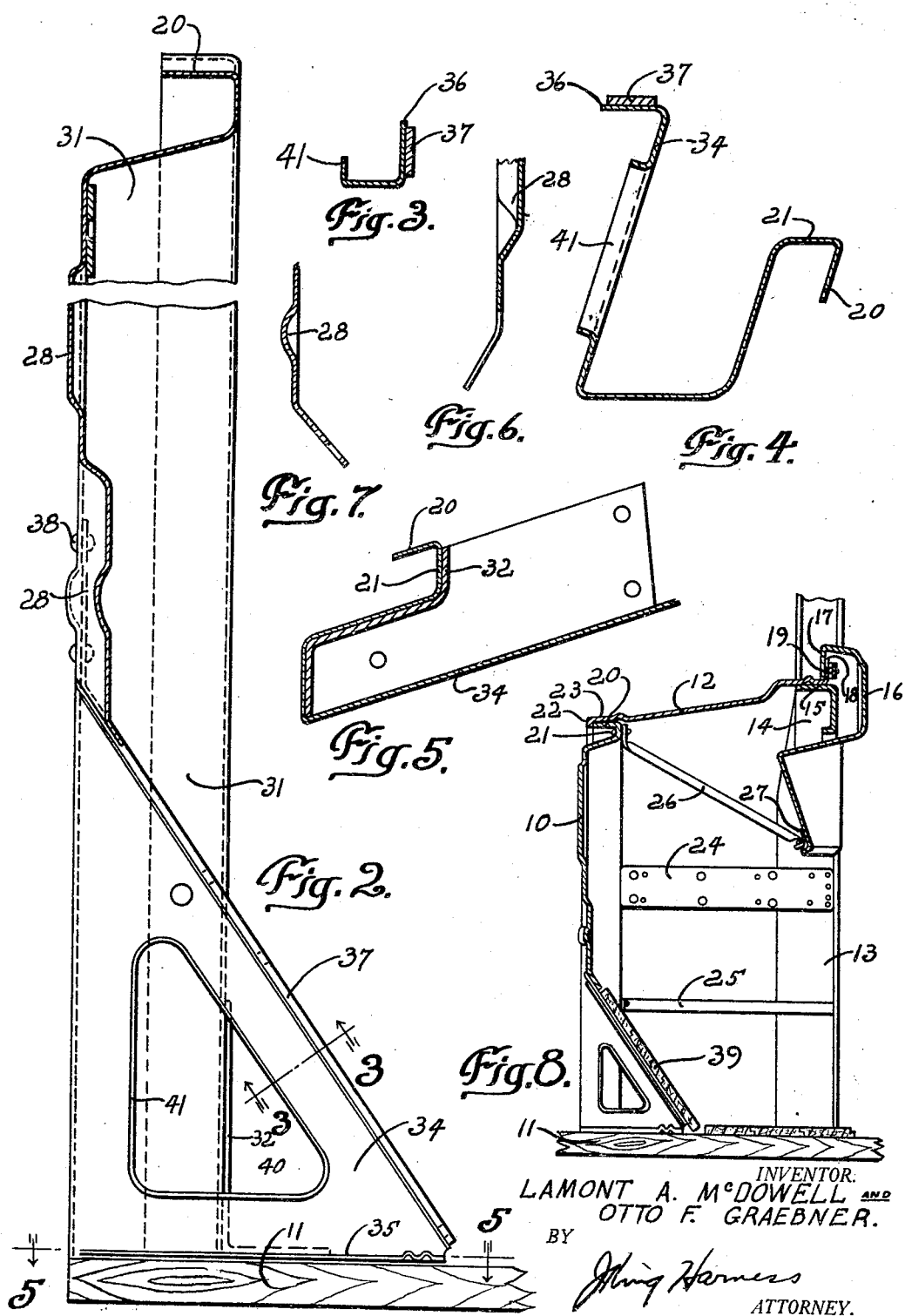

Patented Sept. 15, 1931

1,823,156

UNITED STATES PATENT OFFICE

LAMONT A. McDOWELL AND OTTO F. GRAEBNER, OF DETROIT, MICHIGAN, ASSIGNORS TO THE MURRAY CORPORATION OF AMERICA, A CORPORATION OF DELAWARE

VEHICLE BODY CONSTRUCTION

Application filed March 29, 1928. Serial No. 265,557.

One of the objects of our invention is to provide a metallic dash panel or closure for the forward end of a vehicle body of economical construction and sufficient rigidity to materially strengthen such a body.

Another object of our invention is to provide a metal dash panel for the forward end of a vehicle body which may be quickly and easily secured to the metal cowl panel of such a body.

Another object is to provide a metal dash or closure for the forward end of a vehicle body having bracing means and means for supporting the forward floor boards of the body in an inclined plane formed integrally therewith.

With the above and other objects in view, our invention consists in certain features of construction and combinations of parts to be hereinafter described with reference to the accompanying drawings, and then claimed, having the above and other objects in view.

In the drawings,—

Fig. 1 is a forward elevation of the dash panel embodying our invention.

Fig. 2 is a section taken on line 2—2 of Fig. 1.

Fig. 3 is a section taken on line 3—3 of Fig. 2.

Fig. 4 is a section taken on line 4—4 of Fig. 1.

Fig. 5 is a section taken on line 5—5 of Fig. 2.

Fig. 6 is a section taken on line 6—6 of Fig. 1.

Fig. 7 is a section taken on line 7—7 of Fig. 1.

Fig. 8 is a section similar to Fig. 2, showing the dash panel in its relation to the cowl panel and a forward pillar of the vehicle body.

In Fig. 8 we have shown a dash panel 10 mounted upon a wood sill member 11 and supporting the front end of a cowl panel 12. Secured to the sill member 11 to the rear of the dash panel 10 is a forward pillar member 13. Secured to the pillar 13 intermediate its ends is one end of a cowl bar 14. The rear end of the cowl panel 12 is secured to the cowl bar 14 by spot-welding or other suitable means as at 15. An instrument panel 16 having a downwardly turned flange 17 on its upper edge is secured to an upwardly turned flange 18 on the rear edge of the cowl panel 12 by bolts 19 or other suitable means.

The dash panel 10 is formed with its side and top edges rearwardly and return bent thus providing a forwardly extending flange 20 and a reinforcing channel 21 which add materially to the strength and rigidity of the panel. The forward edges of the cowl panel 12 may be bent over the end of the flange 20 as at 22 and secured to the upper surface of flange 20 as at 23 preferably by spot-welding. Braces 24 and 25 extend between the pillar 13 and dash panel 10 and may be secured at their ends by rivets or other suitable means to the transverse flange of the angle-shaped pillar 13 and to the bottom of the channel 21 of the dish panel, respectively. A diagonal brace 26 extends between the lower edge of the instrument panel 16, which is reinforced by an angle bar 27, and the bottom of the channel 21 in the upper edge of the dish panel 10. The brace 26 has its ends secured by rivets or other suitable means to the reinforcing angle bar 27 and the lower edge of the instrument panel 16 and the bottom of the channel 21 in the dash panel 10.

Referring to Fig. 1, it will be noted that the dash panel 10 has its lower intermediate portion cut away to provide clearances for the rear end of an engine and transmission casing (not shown). Corrugations 28 are formed on the upper and central intermediate portions of the dash panel 10 for adding rigidity thereto. The cutting away of the lower intermediate portion of the panel 10 forms legs 30 and 31 on the lower portions of each side thereof, the ends of which rest upon and are secured to the wood sill members 11. Angle braces 32 having horizontally extending feet are secured to the lower ends of the legs 30 and 31 on the inside thereof by rivets or welding, and the horizontal feet of the braces 32 rest upon and are secured by bolts or screws to the sills 11.

Triangular braces 34 are formed integrally on the inner edges of the legs 30 and 31 and are bent rearwardly so that their bases 35 having inwardly extending lateral flanges thereon, Fig. 2 and Fig. 5, rest upon the upper surfaces of the sills 11. These braces are substantially of the shape of right-angle triangles having bases resting upon the upper surface of the sills 11 and each having its hypothenuse extending in an inclined plane from the upper end of the legs 30 and 31 to the sills 11. Lateral flanges 36 are formed upon the inclined edges of the braces 34 (Fig. 4) providing supporting surfaces for the metal straps 37 which are secured by their upper ends by rivets or other suitable means, as at 38 to the dash panel 10, and form inclined supports for the flood boards 39, Fig. 8. Apertures 40 are cut in the central part of the members 34 and lateral flanges 41 (Fig. 4) are formed around the edges of the apertures for stiffening the members 34.

Our dash panel is a considerable improvement over the forms heretofore used, the flange 20 around the sides and top forming a surface to which the end of the cowl panel may be readily attached by spot-welding from the outside of the body. Heretofore inwardly extending flanges were formed around the sides and top of the panel, and the cowl panel attached to these flanges. In order to attach the cowl and dash panels in such cases it was necessary to use rivets and to work inside of the cowl panel which was very inconvenient and required more labor than is necessary to attach our dash panel to the cowl panel. It was not feasible to attach the cowl panel to the dash panel by spot-welding when the dash panel was formed with the inwardly extending flanges. The formation of the outwardly extending flange 20 and the channel 21 adds materially to the rigidity of the dash panel as a whole. The formation of the members 34 on the legs 30 and 31 of the dash panel 10 eliminates the necessity of constructing separate braces for supporting the forward floor boards of the body in an inclined plane to form the toe riser or support, and reduces the cost of construction of bodies in eliminating the necessity of constructing and installing separate toe riser supports. The members 34 also brace the dash panel upon the sills and being integral therewith add strength to the construction.

It will be obvious that various changes may be made in the arrangement, combination and construction of the various parts of our improved device without departing from the spirit of our invention, and it is our intention to cover by our claims such changes as may be reasonably included within the scope thereof.

What we claim is:

1. In an automobile body, a panel for closing the forward end of the cowl comprising a metal sheet having its side and top edges rearwardly and return bent thereby forming a reinforcing channel and an attaching flange about three sides thereof, and having intergral rearwardly extending sill bracing webs disposed in vertical plane, formed from the same sheet adjacent its lower side edges.

2. In an automobile body including longitudinal sill members, a floor, and a cowl panel, a closure and support for the forward end of the cowl panel comprising a metal sheet having the side and top edges thereof rearwardly and return bent to form an outwardly facing reinforcing channel and an attaching flange, and having an integral and rearwardly inclined triangular flange formed from the same sheet and spaced inwardly of and adjacent to each lower side edge for bracing said metal sheet relative to the body sills and providing an inclined support for the forward floor boards of said body.

3. In an automobile body, a panel for closing the forward end of the cowl comprising a metal sheet having its lower intermediate portion cut away to provide engine clearance, and having the sides of said cut-away portion formed to provide vertically disposed triangular web portions which are rearwardly bent along one side of the triangle and have their lower edges laterally bent to provide a rearward bracing footing for the panel on the body sill, and having their upper edges inclined upwardly from sill to panel and laterally bent to provide supporting flanges for the toe boards of the body floor.

LAMONT A. McDOWELL.
OTTO F. GRAEBNER.